(12) United States Patent
Papamoschou et al.

(10) Patent No.: US 9,175,577 B2
(45) Date of Patent: Nov. 3, 2015

(54) QUIET BLEED VALVE FOR GAS TURBINE ENGINE

(75) Inventors: Dimitri Papamoschou, Mission Viejo, CA (US); Feng Liu, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 735 days.

(21) Appl. No.: 13/438,662

(22) Filed: Apr. 3, 2012

(65) Prior Publication Data

US 2012/0256107 A1  Oct. 11, 2012

Related U.S. Application Data

(60) Provisional application No. 61/472,028, filed on Apr. 5, 2011, provisional application No. 61/475,464, filed on Apr. 14, 2011.

(51) Int. Cl.
| | |
|---|---|
| F02C 9/18 | (2006.01) |
| F01D 17/10 | (2006.01) |
| F02C 6/08 | (2006.01) |
| F02K 3/075 | (2006.01) |

(52) U.S. Cl.
CPC ............... *F01D 17/105* (2013.01); *F02C 6/08* (2013.01); *F02C 9/18* (2013.01); *F02K 3/075* (2013.01); *F05D 2260/96* (2013.01)

(58) Field of Classification Search
CPC ............ F01D 17/105; F02C 6/08; F02C 9/18; F05D 2260/96; F02K 3/075
USPC .............................. 251/127, 118; 60/262, 725; 181/212–213
See application file for complete search history.

(56) References Cited

U.S. PATENT DOCUMENTS

| | | | |
|---|---|---|---|
| 3,227,241 A | 1/1966 | Mattoon | |
| 3,964,519 A | 6/1976 | De Baun | |
| 5,060,471 A * | 10/1991 | Torkelson | ...................... 60/262 |

(Continued)

FOREIGN PATENT DOCUMENTS

| | | |
|---|---|---|
| EP | 1106786 A2 | 6/2001 |
| EP | 2184448 A2 | 5/2010 |
| GB | 2405666 A | 3/2005 |

OTHER PUBLICATIONS

International Search Report for International Application No. PCT/US2012/032030 filed Apr. 3, 2012 (ISR dated Jun. 27, 2012.
Supplemental European Search Report for (International Application No. PCT/US2012/032030 filed Apr. 3, 2012) European Patent Application EP12768086 dated Aug. 29, 2014.

*Primary Examiner* — John Bastianelli
(74) *Attorney, Agent, or Firm* — Blakely Sokoloff Taylor & Zafman LLP

(57) ABSTRACT

A bleed valve that expels a gas from a compressed region includes a valve section and a muffler section coupled to and located downstream from the valve section. The valve section includes a centerbody and a housing. The centerbody supports a plunger that controls opening and closing of the bleed valve. The centerbody is coupled to the housing by at least one strut disposed substantially radially. The at least one strut may have a cross-section that reduces or suppresses flow separation and vortex shedding from the at least one strut. The muffler section may include a baffle plate and a dome plate. A honeycomb may be installed between the baffle plate and the dome plate. The bleed valve may also include a middle plate on a face of the honeycomb and a conical diverter immediately upstream from the baffle plate. Other embodiments are also described.

33 Claims, 13 Drawing Sheets

(56) References Cited

U.S. PATENT DOCUMENTS

| | | | |
|---|---|---|---|
| 5,477,673 A * | 12/1995 | Blais et al. | 60/785 |
| 5,706,651 A * | 1/1998 | Lillibridge et al. | 60/262 |
| 5,849,251 A * | 12/1998 | Timko | 60/287 |
| 6,615,576 B2 * | 9/2003 | Sheoran et al. | 181/222 |
| 6,701,716 B2 * | 3/2004 | Rayer et al. | 251/282 |
| 7,434,405 B2 * | 10/2008 | Gukeisen et al. | 251/129.11 |
| 2005/0019156 A1 | 1/2005 | D'Angelo et al. | |
| 2005/0263199 A1 | 12/2005 | Meheen | |
| 2010/0043447 A1 | 2/2010 | Kirby | |

* cited by examiner

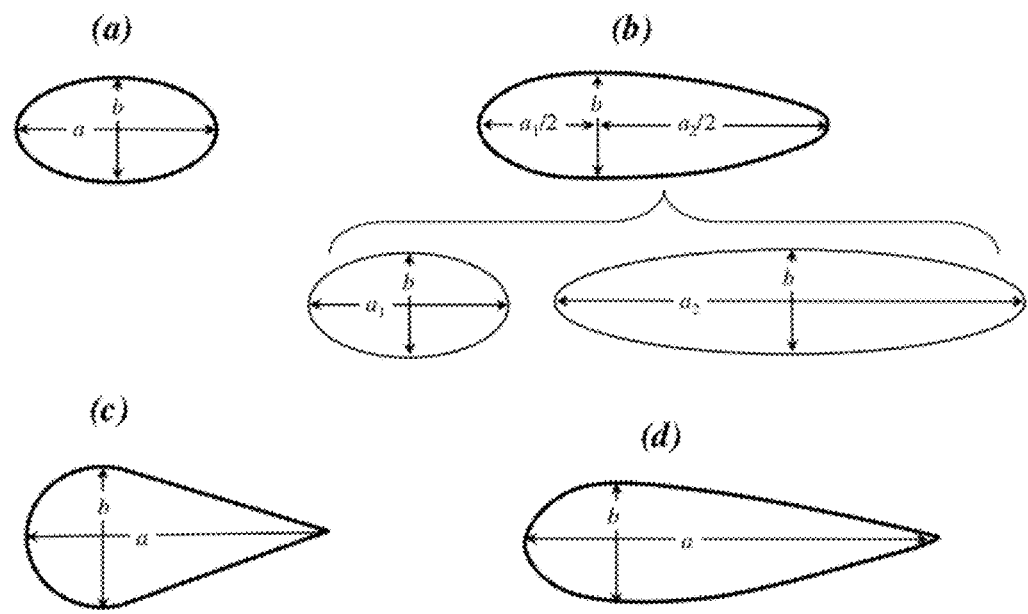
FIG. 6
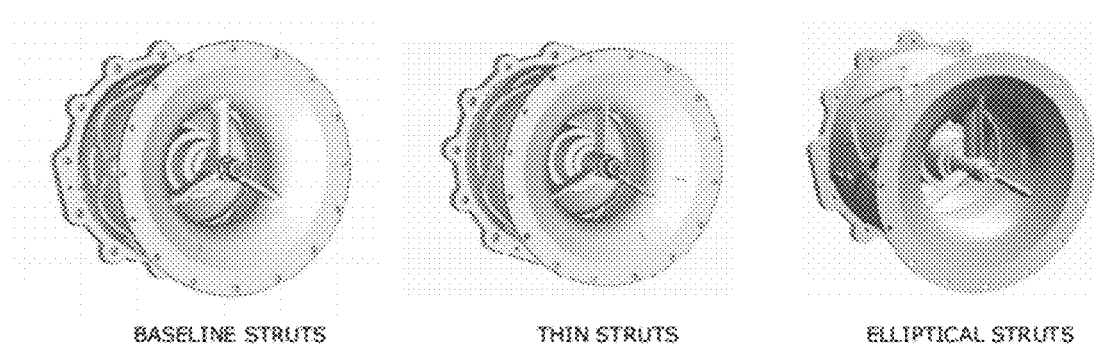
FIG. 4A  FIG. 4B  FIG. 4C

QUIET BLEED VALVE FOR GAS TURBINE ENGINE

CROSS REFERENCE TO RELATED APPLICATIONS

This present U.S. Non-Provisional Patent Application claims the benefit of the earlier filing dates of related U.S. Provisional Application No. 61/472,028, filed Apr. 5, 2011 and U.S. Provisional Application No. 61/475,464, filed Apr. 14, 2011. Both U.S. Provisional Application No. 61/472,028 and U.S. Provisional Application No. 61/475,464 are hereby incorporated herein by reference.

TECHNICAL FIELD

An embodiment of the invention relates generally to gas turbine engines using compressor bleed valves.

BACKGROUND

Compressor bleed valves may be found on gas turbine engines powering commercial and military aircraft. At certain stages of the engine operation, the valves bleed high-pressure air from the compressor into the fan duct. The resulting process generates noise that may dominate over other sources of engine noise. Thus, particularly on approach when the engine is throttled back, the noise generated from the valves becomes a significant factor of overall aircraft noise. Bleed valves are typically installed on the high-pressure and intermediate-pressure sections of the compressor, hence the naming High Pressure Bleed Valve (HPBV) and Intermediate Pressure Bleed Valve (IPBV).

Current techniques to suppress noise from bleed valves in gas turbine engines have a number of drawbacks. These existing techniques involve a muffler with one or more stages of perforated plates. The stages of perforated plates in these designs have rendered the resulting design to be bulky and heavy which penalizes engine performance. In addition, adding many suppression stages reduces the mass flow rate such that the valve design is required to be larger which again gives rise to weight issues.

SUMMARY

In one embodiment of the invention, a quiet bleed valve in a gas turbine engine comprises a valve section and a muffler section. The bleed valve expels gas from a compressed region. The valve section includes struts that have a streamlined cross-section to prevent substantial flow separation and suppress vortex shedding. The cross-section of the struts may be in the following shapes: an ellipse, an asymmetric ellipse, a rounded triangle, and an airfoil. In this embodiment, the ellipse and the asymmetric ellipse have an aspect ratio equal to or greater than 2, and the rounded triangle and the airfoil have a chord-to-thickness ratio equal to or greater than 2. The muffler section is coupled to the valve section and is downstream from the valve section. The muffler section includes a honeycomb section that may be enclosed within perforated plates.

In another embodiment of the invention, a quiet bleed valve in a gas turbine engine comprises a valve section and a muffler section. The valve section includes a housing, a centerbody and struts. The struts support the centerbody on the housing. The muffler section is coupled to the valve section and is downstream from the valve section. The muffler section may include a baffle plate, a dome plate placed downstream from the baffle plate, and a honeycomb flow straightener placed between the baffle plate and the dome plate.

In yet another embodiment of the invention, a method of designing and manufacturing a quiet bleed valve includes one or more of the steps of: designing and fabricating streamlined struts that provide structural support for the centerbody of the valve and reduce or suppress flow separation and vortex shedding from the struts; and designing and fabricating a muffler section attached to the downstream part of the valve, the muffler section including at least one honeycomb flow straightener.

In yet another embodiment of the invention, a method of designing and manufacturing quiet bleed valve by modifying an existing bleed valve to reduce its sound, the modification including one or more of the steps of: streamlining support struts in the valve flow path to reduce or suppress flow separation and vortex shedding from the struts; and inserting at least one honeycomb flow straightener in the muffler section downstream of the valve section.

The above summary does not include an exhaustive list of all aspects of the present invention. It is contemplated that the invention includes all systems, apparatuses and methods that can be practiced from all suitable combinations of the various aspects summarized above, as well as those disclosed in the Detailed Description below and particularly pointed out in the claims filed with the application. Such combinations may have particular advantages not specifically recited in the above summary. Further, the field of the invention may extend to valves used in pneumatic systems other than in gas turbine engines.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings:

FIG. 4A-4C illustrate perspective views of the bleed valve designs including the baseline struts (FIG. 4A), and, according to one embodiment of the invention, thin struts (FIG. 4B) and, according to another embodiment of the invention, struts with elliptical cross section (FIG. 4C).

FIG. 6 illustrates the shapes of the streamlined cross-sections of the struts according to one embodiment of the invention.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

According to the embodiments of the invention, a technique to reduce noise emitted from bleed valves in gas turbine engines of commercial or military aircraft is disclosed. The technique is effective for both High Pressure Bleed Valve (HPBV) and Intermediate Pressure Bleed Valve (IPBV).

As disclosed herein, the system, method and apparatus of noise suppression from bleed valves employ the following individual approaches and their combinations: (1) Streamlining support struts in the valve structure to suppress vortex shedding, and thus reducing the noise associated with vortex shedding; (2) Installing a honeycomb flow straightener in the muffler section of the valve; and (3) Enhancing the design with optional additions of a middle plate on the upstream side of the honeycomb and a conical diverter immediately upstream of the muffler.

The following description is the divided into three parts. Part I describes the baseline bleed valve and the struts having a streamlined cross-section according to one embodiment of the invention. Part II describes the bleed valves including a honeycomb flow straightener in the muffler section according to one embodiment of the invention. Part III describes alternative enhancements on the bleed valves according to one embodiment of the invention.

Part I: Baseline Bleed Valve and Struts Having a Streamlined Cross-Section

Figure 1:
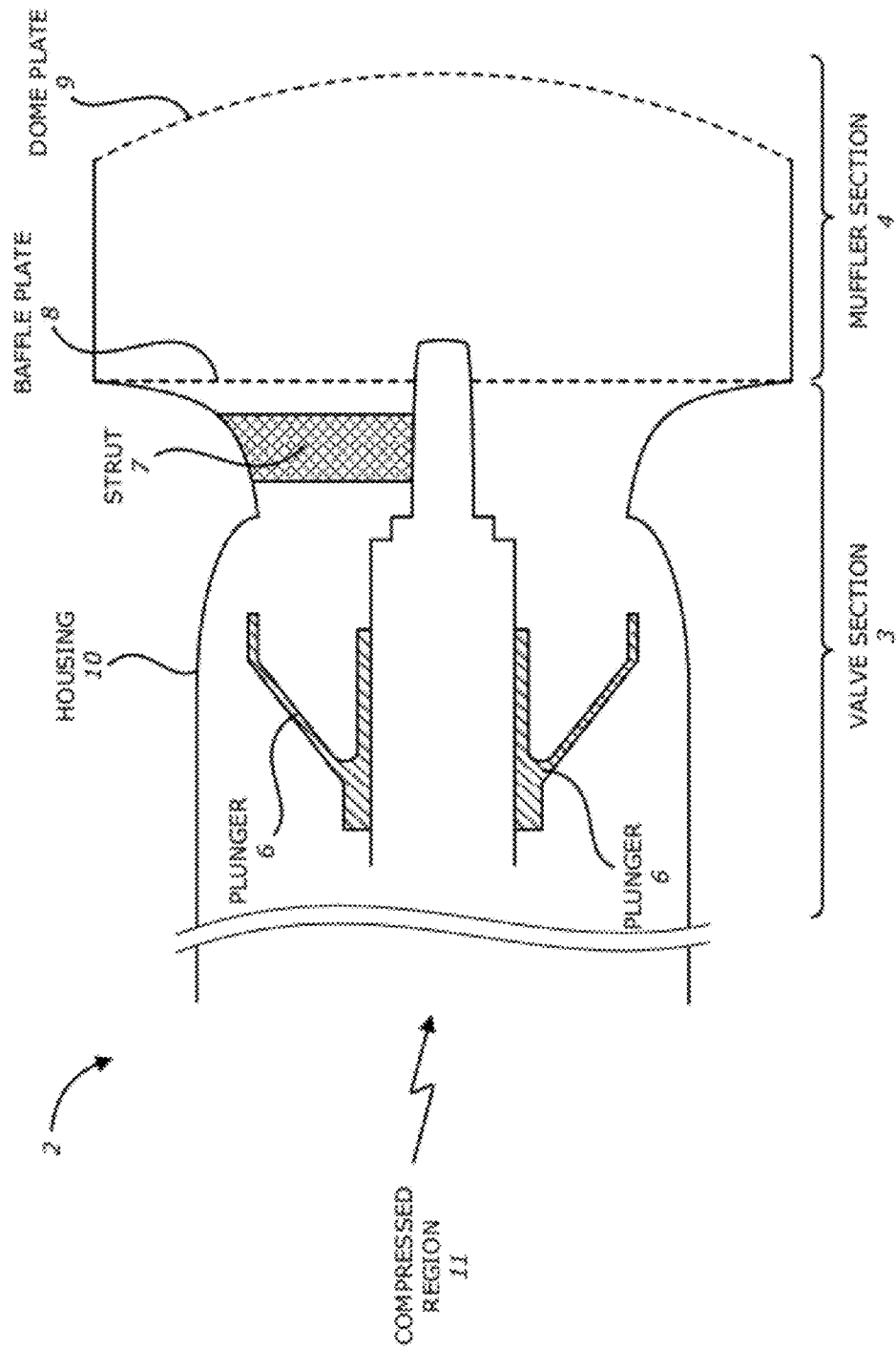
FIG. 1 illustrates a cross section view of one example of a baseline bleed valve design.

A turbofan engine is one example in which an embodiment of the invention may be implemented. The turbofan engine includes compressor bleed valves 2, as illustrated in FIG. 1. Bleed valves are typically installed on the high-pressure and intermediate-pressure sections of the compressor and as such, the valves are called High Pressure Bleed Valve (HPBV) and Intermediate Pressure Bleed Valve (IPBV).

FIG. 1 illustrates a cross section view of one example of a baseline bleed valve design. The bleed valve 2 illustrated in FIG. 1 is referred to as the baseline bleed valve. This baseline bleed valve 2 expels a gas from a compressed region 11 and includes a main valve section 3 and a muffler section 4.

The muffler section 4 of the baseline bleed valve 2 may include a baffle plate 8 and a dome plate 9. As shown in FIG. 1, the baffle plate 8 may be flat and perforated and the dome plate 9 may be curved and perforated. In other embodiments, the dome plate 9 may be flat.

The main valve section 3 may include a housing 10, a centerbody 5, a plunger 6 and radial struts 7. The gas from the compressed region 11 flows between the centerbody 5 and the housing 10. The centerbody 5 supports the plunger 6 that translates axially on the centerbody 5 to start or stop the flow. The downstream end of the centerbody 5 (e.g., aft end) may be supported on the housing 10 by struts 7 which are typically located near the minimum area of the valve. The minimum area of the valve is the highest velocity region of the valve. For typical pressure ratios, the flow over the struts may be high-subsonic or supersonic.

Figure 2:
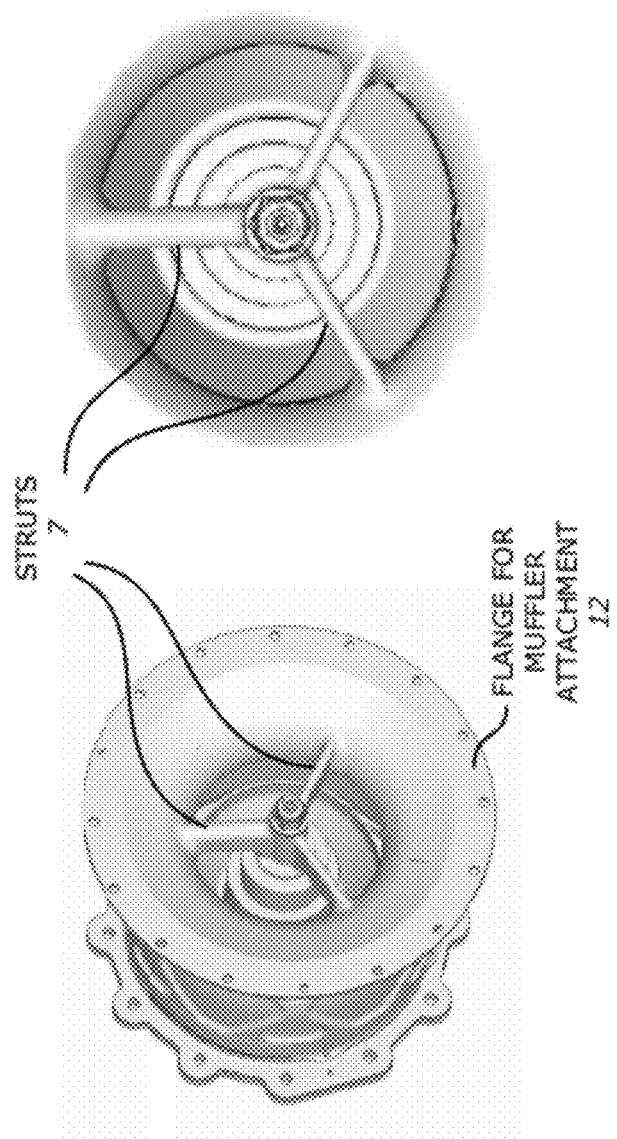
FIG. 2 illustrates frontal and perspective views of one example of a baseline bleed valve design.

FIG. 2 illustrates frontal and perspective views of an example of a baseline bleed valve design. In this embodiment, the baseline bleed valve design includes three struts 7 and may be coupled to a flange for muffler attachment 12. As shown in FIG. 2 and FIG. 4A, three struts 7 of the baseline bleed valve 2 extend radially from the centerbody 5 at even azimuthal increments of 120 degrees. In the baseline bleed valve 2, one of the three struts 7 is thicker to allow passage of a pneumatic line that controls the opening and closing of the valve 2. The cross section of the baseline struts 7 is a rounded rectangle.

While the aforementioned strut 7 details are illustrative of the baseline valve design, the noise reduction approach that follows is generic for any design that employs the basic arrangement illustrated in FIG. 2. For instance, this basic arrangement may have fewer or more than three struts 7, the cross section of the baseline struts may be a different blunt shape, the thickness of the baseline struts may also differ, and the struts may be located at different axial locations in the valve.

Figure 3:
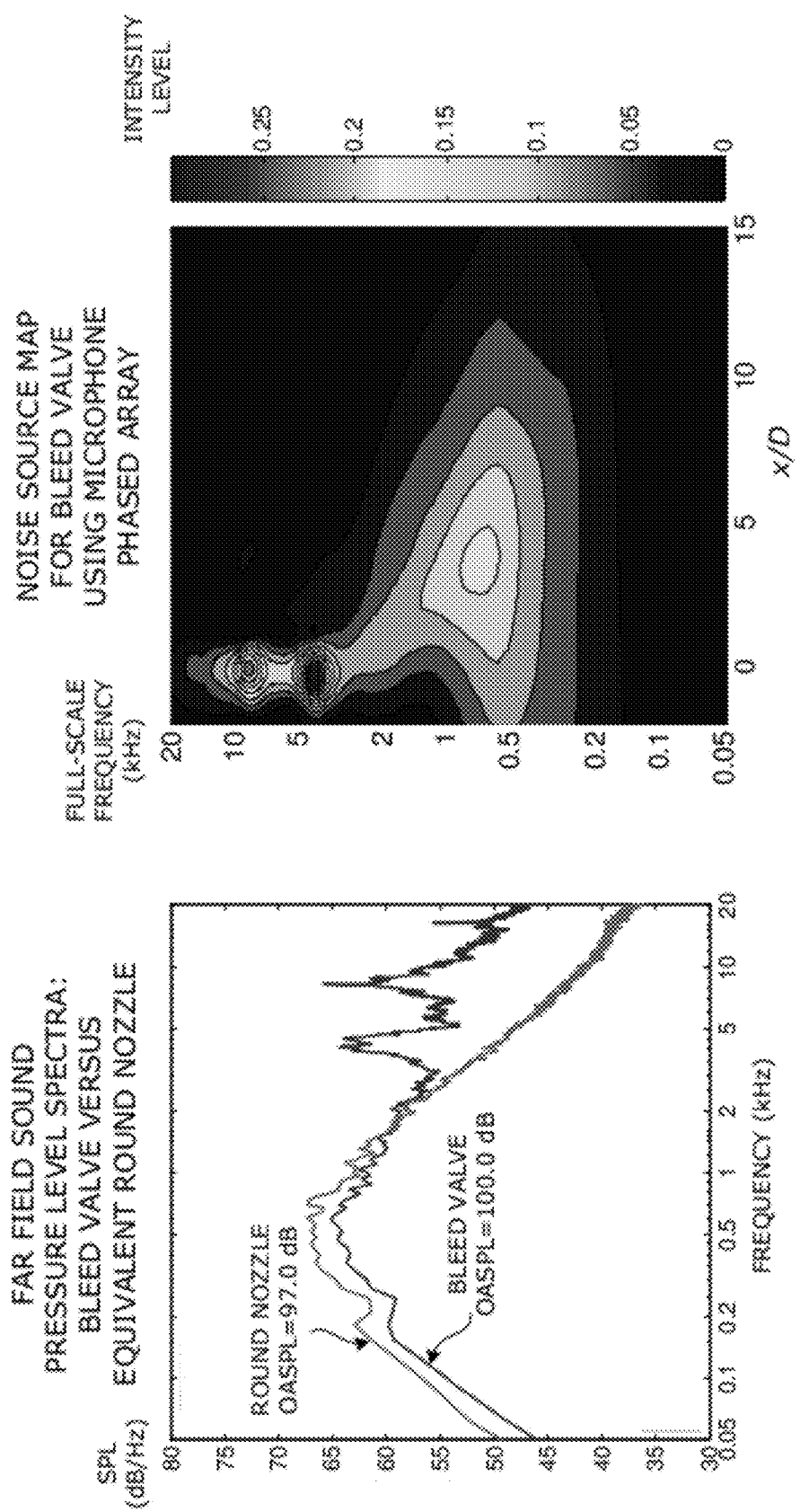
FIG. 3 illustrates far field sound pressure level spectra and noise source map according to one embodiment of the invention.

FIG. 3 illustrates far field sound pressure level spectra and a noise source map according to one embodiment of the invention. Aero-acoustic measurements using microphone arrays inside an anechoic chamber were performed with the valve section in isolation (without muffler section) and with the combination of valve section and muffler section. For the valve section in isolation, the measured sound pressure levels as shown in FIG. 3 (left) indicate that the valve emits noise much stronger than a turbulent jet issuing from a round nozzle having the same equivalent-diameter as the valve section and operated at the same nozzle pressure ratio as the valve section. Further, the noise source map, as shown in FIG. 3 (right), using beamforming of the array microphones, show that the excess noise originates from the exit plane of the valve section. Among the various valve components that may cause noise from that location, the struts 7 are deemed a prime candidate.

Accordingly, the first approach in the design of a quiet bleed valve included streamlining support struts in the valve structure. To test this hypothesis, the struts 7 are made very thin since complete removal of the struts 7 would have yielded a structurally unsound design. The redesigned valve including thin struts 7, as shown in FIG. 4B, was tested acoustically and the excess noise was found to disappear. However, if the very thin struts as shown in FIG. 4B are found to the lack structural support required to support a centerbody 5 of the valve 3, one embodiment of the present invention includes struts 7 that have an elliptical cross-section as shown in FIG. 4C. The struts that have an elliptical cross-section are referred to as "elliptical struts." The acoustic measurements performed using elliptical struts reveal excess noise being practically eliminated and yielding acoustic spectra very similar to that of the thin strut.

Figure 5:
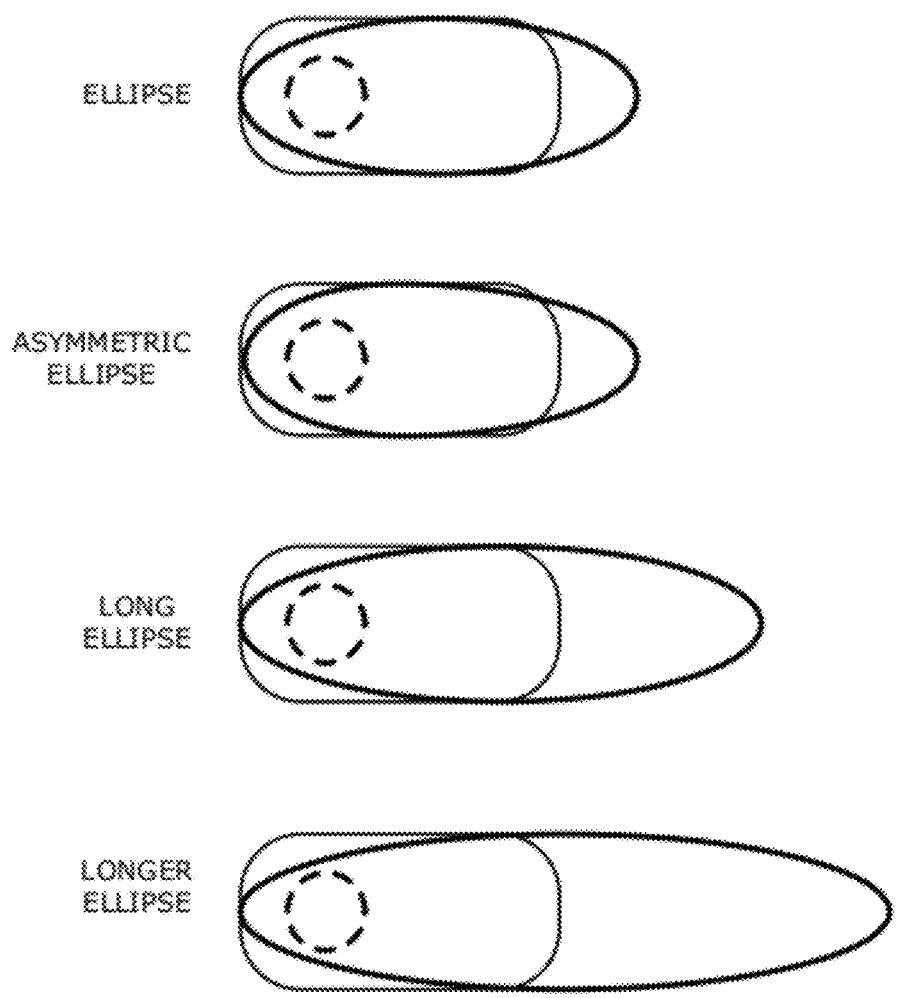
FIG. 5 illustrates the shapes of the streamlined cross-sections of the struts according to one embodiment of the invention.

FIG. 5 illustrates the shapes of the streamlined cross-sections of the struts 7 according to one embodiment of the invention. In FIG. 5, the shapes of the streamlined cross-sections that may include an ellipse, asymmetric ellipse, long ellipse and longer ellipse are compared to the baseline strut cross-section which is a rounded rectangle. In FIG. 5, the streamlined cross-sections are illustrated in a darker line than the baseline strut cross-sections. Unsteady Reynolds Averaged Navier Stokes (URANS) computation reveals that the shapes of the streamlined cross-sections of the struts 7 in FIG. 5 suppressed vortex shedding and thus suppressed excess noise that is caused by the shedding.

Referring to FIG. 6, the shapes of the streamlined cross-sections of the struts 7 are further discussed. In one embodiment, the shape of the streamlined cross-section of the struts 7 may be an ellipse with major axis a and minor axis b, and with the aspect ratio a/b greater than or equal to 2 (FIG. 6a). In another embodiment, the shape of the streamlined cross-section may be an asymmetric ellipse that includes a forward half of the asymmetric ellipse having a major axis $a_1$ and a rear half of the asymmetric ellipse having a major axis $a_2$. In the asymmetric ellipse, both the forward half and the rear half sharing the same minor axis b and the aspect ratio $(a_1+a_2)/2b$ is equal of greater than 2 (FIG. 6b). In another embodiment, the shape of the streamlined cross-section may be a rounded triangle with chord-to-thickness ratio a/b equal or greater than 2 (FIG. 6c). In yet another embodiment, the shape of the streamlined cross-section may be an airfoil with chord-to-thickness ratio a/b equal of greater than 2 (FIG. 6d). In the airfoil shape embodiment, the NACA 00xx series airfoil shape which includes symmetric sections may be used.

In other embodiments, if the structural requirement of holding the centerbody 5 may be accomplished with thin support elements, the struts 7 may be shaped into thin plates as shown in FIG. 4B. Experimentation on this embodiment has shown that an aspect ratio greater than or equal to 5 would reduce vortex shedding, regardless of the shape of the leading and trailing edges of the flat plate comprising the strut.

As an alternative embodiment, the struts 7 may be placed upstream of the exit plane of the valve 3, in a flow environment that is low subsonic. In this embodiment, the vortex shedding from a blunt-shaped strut may be weak enough in terms of pressure fluctuation due to the low dynamic pressure of the subsonic flow such that a significant level of noise is not being produced. In order to further reduce the noise being produced, the upstream placement of the struts 7 may also be combined with streamlining the cross-sections of the struts 7 or making the struts 7 very thin.

Figure 7:
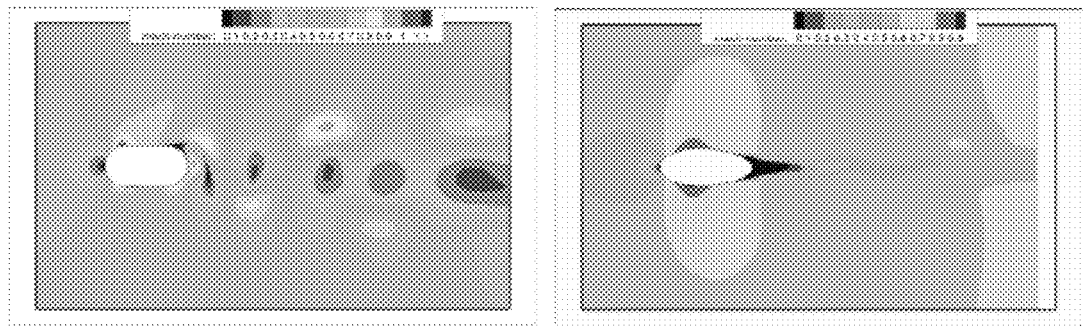
FIG. 7 illustrates the image profiles of the Mach number contours according to one embodiment of the invention.

FIG. 7 illustrates the image profiles of the Mach number contours according to one embodiment of the invention. As shown in FIG. 7, vortex shedding is illustrated for the baseline strut (left) and absence of vortex shedding for the strut being modified to have a streamlined cross-section (right).

Figure 8:
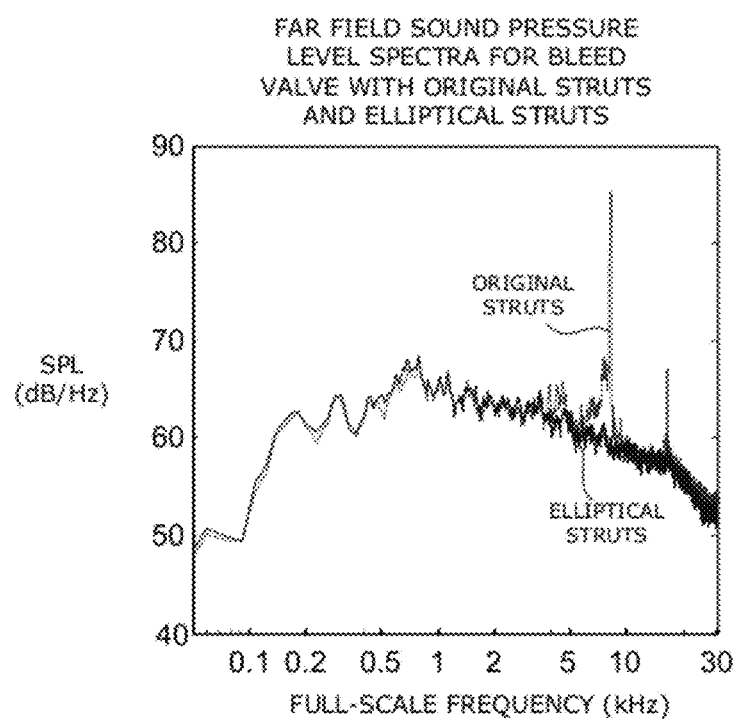
FIG. 8 illustrates the sound pressure level measured with respect to the full-scale frequency according to one embodiment of the invention.

FIG. 8 illustrates the sound pressure level measured with respect to the full-scale frequency according to one embodiment of the invention. As shown by the difference between measurements for bleed valves with original (baseline) struts and bleed valves with elliptical struts, the bleed valves with the elliptical struts may eliminate the spikes in the sound pressure level.

One preferred embodiment may use struts with a cross-section that is streamlined such that substantial flow separation and suppresses vortex shedding are suppressed when operated at the Mach number and Reynolds number environment of the valve struts. Determination of such desired property of the cross-section is based on, for instance: documentation in the literature; demonstrated by an unsteady computation such as URANS, Large Eddy Simulation, or Direct Navier Stokes solver; and demonstration by laboratory experiments.

Part II: Bleed Valves Including a Honeycomb in the Muffler Section

Figure 9:
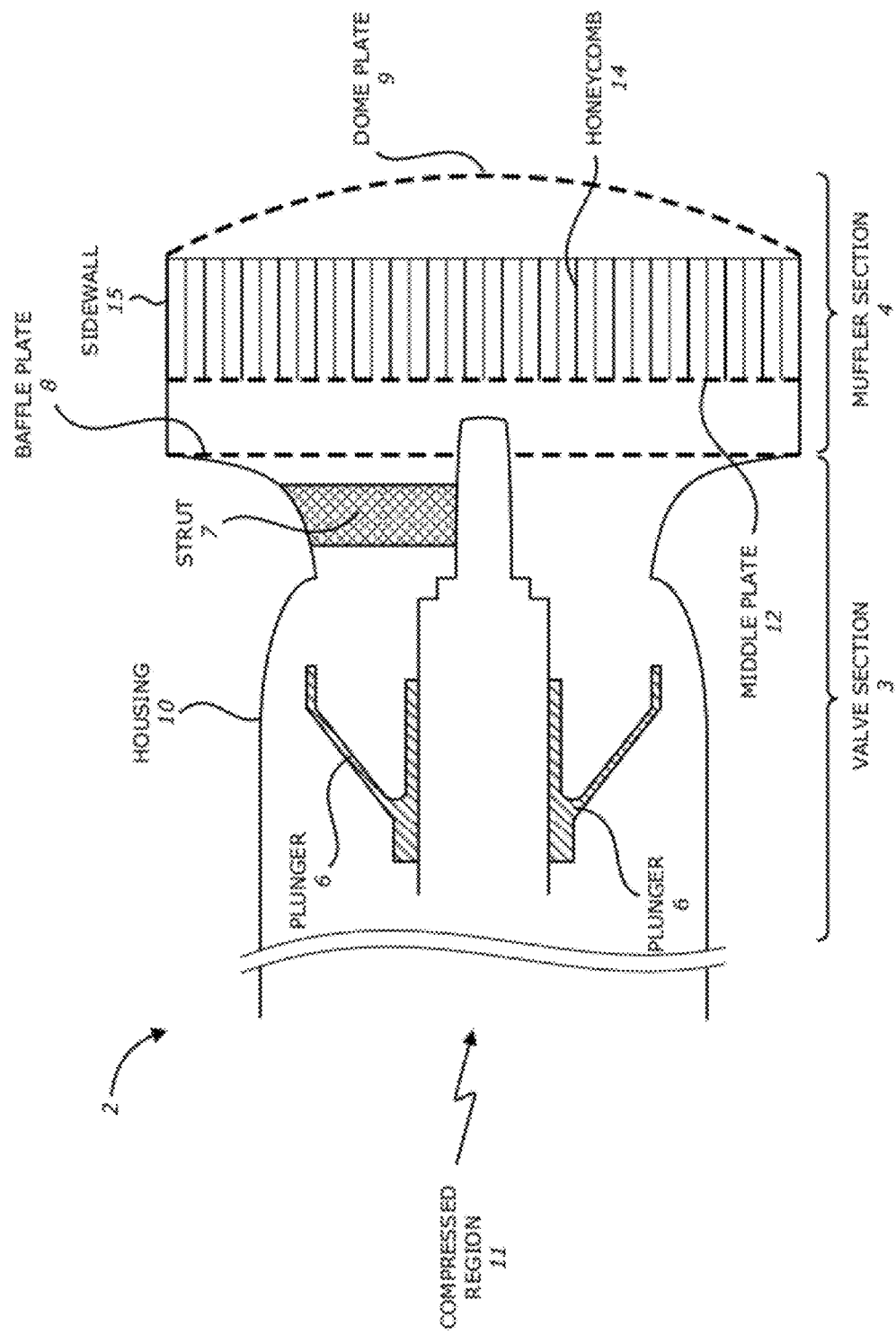
FIG. 9 illustrates a cross-section view of the bleed valve including a honeycomb according to one embodiment of the invention.

The second approach in the design of a quiet bleed valve includes adding a honeycomb flow straightener in the muffler section of the bleed valve. FIG. 9 illustrates a cross-section view of the bleed valve including a honeycomb and FIG. 10 illustrates an exemplary assembly of components of the bleed valve including a honeycomb according to one embodiment of the invention.

In this embodiment, the baseline bleed valve 2 from FIG. 1 is further modified to comprise a honeycomb flow straightener 14 inside the muffler cavity of muffler section 4. As shown in FIGS. 9 and 10, the muffler section 4 includes the baffle plate 8, the dome plate 9 that is placed downstream from the baffle plate 8, and a honeycomb flow straightener 14 that is placed between the baffle plate 8 and the dome plate 9. The typical muffler allows sufficient space for installation of the honeycomb section as shown in FIG. 9. However, in cases where a longer honeycomb is desired, the sidewall 15 may be extended to accommodate a longer honeycomb section. An optional spacer 13, shown in FIG. 10, may be used to support the honeycomb 14 against the dome plate 9 and provide precise control over a gap between the honeycomb and the dome plate.

In this embodiment, the honeycomb 14 suppresses velocity fluctuations (turbulence) and pressure fluctuations (noise) of the flow emerging from the baffle plate 8. One advantage of the honeycomb 14 is that it is lightweight and presents a minimal obstruction to the flow emerging from the baffle plate 8. Thus, the honeycomb 14 does not impact the mass flow rate through the muffler section 4.

Figure 10:
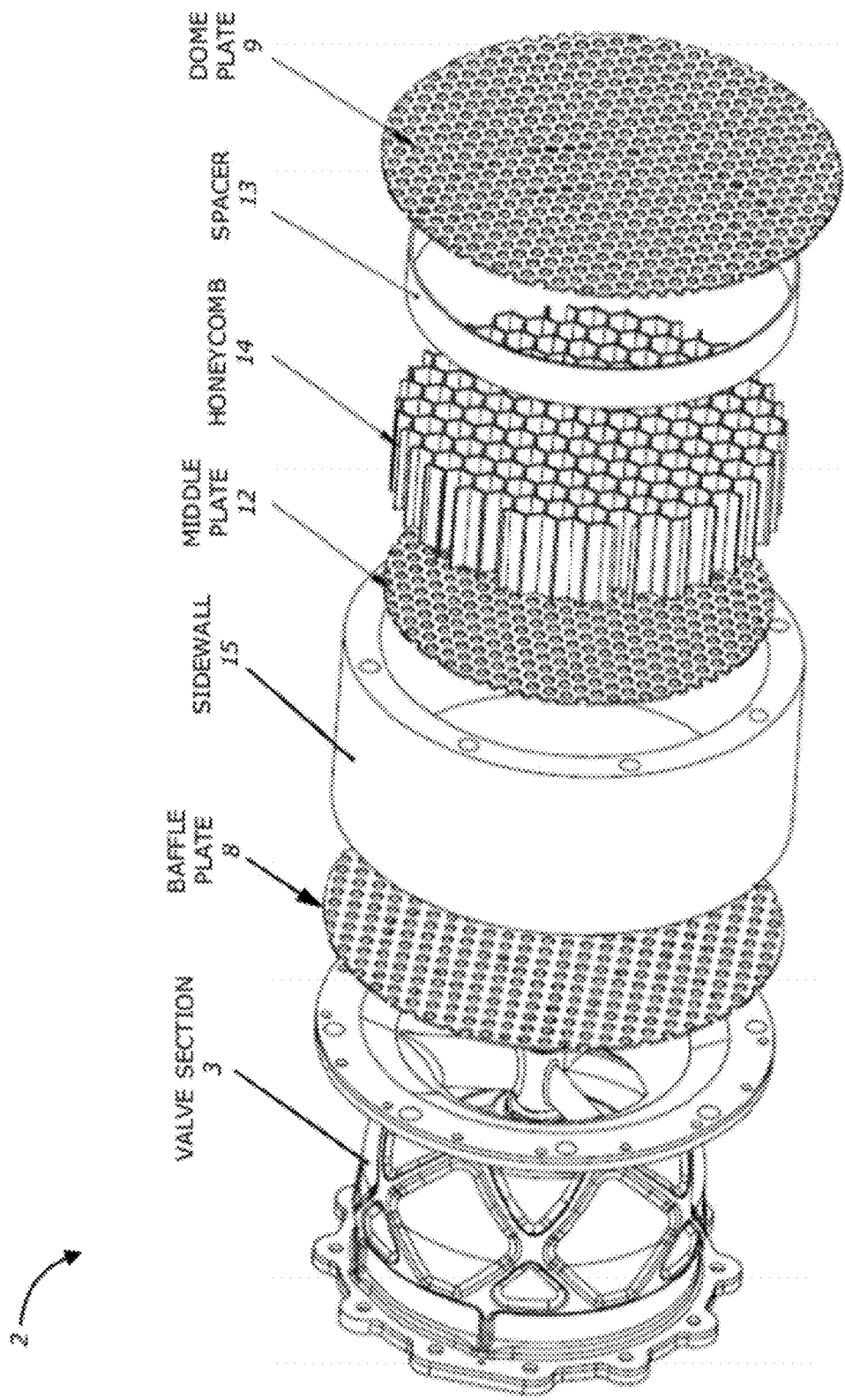
FIG. 10 illustrates an exemplary assembly of components of the bleed valve including a honeycomb according to one embodiment of the invention.

In some embodiments, the muffler section 4 also includes a middle plate 12 that is perforated and placed on the face of the honeycomb 14 located between the honeycomb 14 and the baffle plate 8, as shown in FIGS. 9 and 10.

The choice of porosities for the baffle plate 8, middle plate 12, and dome plate 9 of the muffler section 4 may affect the acoustic performance as well as the flow capacity of the valve 2. Typically, the porosities for each of the plates 8, 9, 12 may be selected so that the flow produced in the absence of the muffler section 4 would not be substantially restricted. In one embodiment, to avoid restriction of flow rate, it is desirable to satisfy the following equation: $\beta \geq A_v/A_m$, where $A_v$ is the equivalent flow area of the isolated valve section, $A_m$ is the cross-sectional area of the muffler section 4, and $\beta$ is the porosity of the baffle plate, middle plate, and/or dome plate. In other embodiments, the acoustic considerations may be a moderately smaller value for $\beta$ for the baffle plate 8, middle plate 12, and/or dome plate 9. In another embodiment, the acoustic considerations may be $\beta \geq 0.7\, A_v/A_m$ for baffle plate 8, middle plate 12, and/or dome plate 9. In yet another embodiment, the acoustic considerations may be $\beta \geq \alpha A_v/A_m$ for baffle plate 8, middle plate 12, and/or dome plate 9, where $\alpha$ may range from 0.7 to 3. Assuming an area ratio $A_m/A_v$ of approximately 5, the porosities of the baffle plate 8, middle plate 12, and dome plate 9 may each range from 14% to 60%. In one embodiment, the following porosity ranges may be utilized: a porosity range of 25% to 35% for the baffle plate 8, 15% to 25% for the middle plate 12, and 15% to 25% for the dome plate 9. If the valve 2 has an area ratio $A_m/A_v$ that is very different from 5, the porosities of each of the plates 8, 9, 12 may be selected accordingly to prevent substantial flow restriction.

Figure 11:
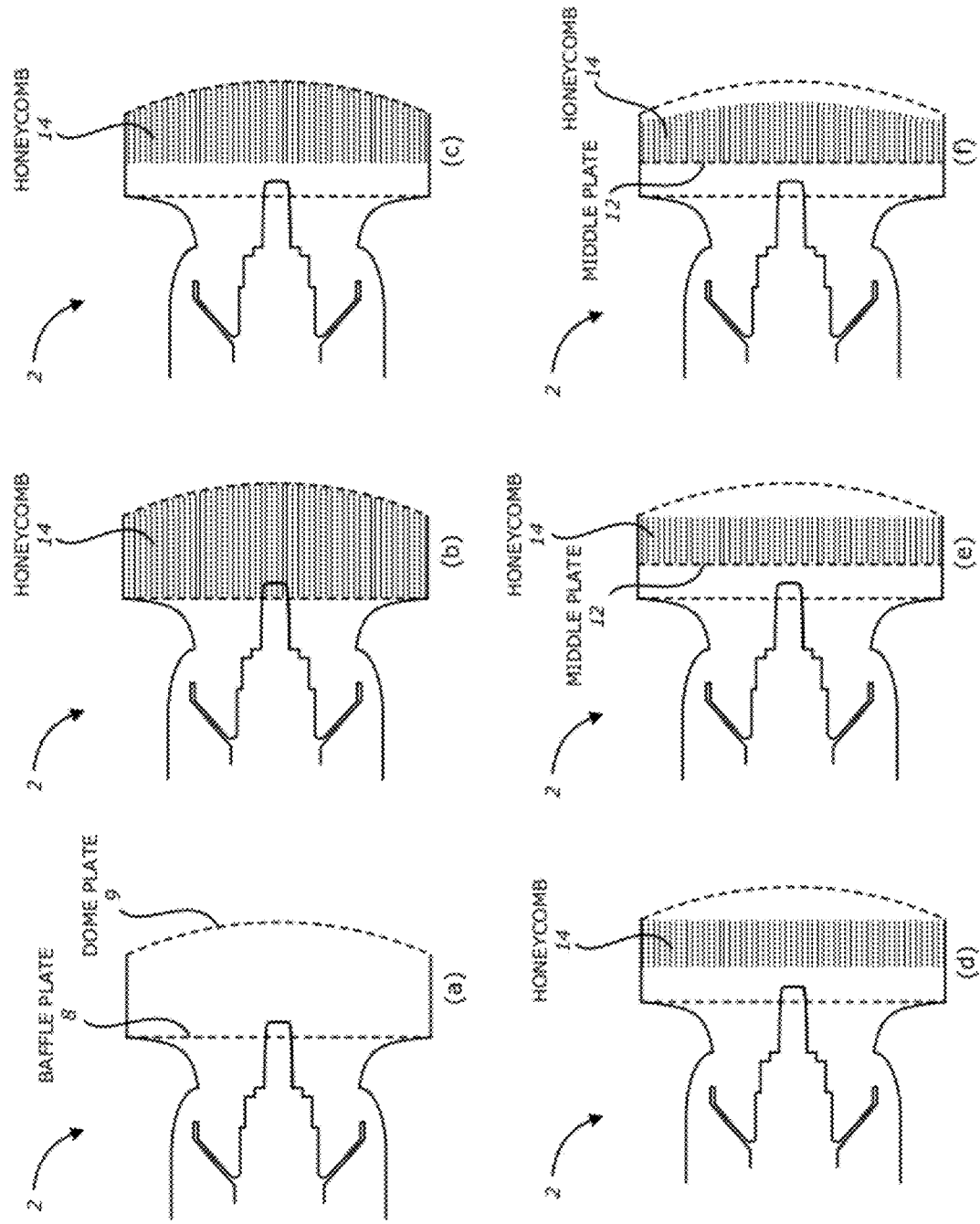
FIG. 11 illustrates alternative installations of the honeycomb in the bleed valve according to one embodiment of the invention.

FIG. 11 illustrates alternative installations of the honeycomb in the bleed valve according to one embodiment of the invention. FIG. 11a shows the baseline muffler section 4 that includes the baffle plate 8 located on the upstream end of the muffler section 4 and the dome plate 9 located on the downstream end of the muffler section 4. In the embodiment illustrated in FIG. 11b, the muffler section 4 includes a honeycomb 14 that spans the entire space between the baffle plate 8 and the dome plate 9. While the arrangement in FIG. 11b provides the maximum length of honeycomb 14, it may lead to non-uniformity of the flow field because the flow is ducted into the honeycomb immediately past the baffle plate 8. In the embodiment illustrated in FIG. 11c, a space is provided between the baffle plate 8 and the honeycomb 14 within the muffler cavity. Experimental and computational mean velocity profiles indicate that this space is useful for allowing the flow to spread between the baffle plate 8 and the honeycomb 14, thus improving the uniformity of the exit flow. In the embodiment shown in FIG. 11d, the honeycomb 14 has flat faces and its installation allows for a space between the baffle plate 8 and the entrance to the honeycomb 14 as well as space between the exit of the honeycomb 14 and the dome plate 9. Acoustic experiments indicate that the arrangement in FIG. 11d provides superior noise reduction, because the aft space enables any fluctuations that emerge from the honeycomb 14 to die down before the dome plate.

The embodiment illustrated in FIG. 11e depicts a variation of the arrangement in FIG. 11d that includes the addition of the middle plate 12 which is a perforated plate that is placed on the upstream face of the honeycomb 14. In this embodiment, the middle plate 12 may enhance the spreading of the flow before the flow enters the honeycomb 14 and may also provide structural support for the honeycomb 14. FIG. 11f illustrates an embodiment, which is a variant of the design of FIG. 11e. In the embodiment of FIG. 11f, the shape of the aft (downstream) end of the honeycomb 14 follows the curvature of the dome plate 9.

While all of the embodiments illustrated in FIGS. 11a-11f have the ability to suppress noise, the embodiment of FIG. 11d may be the preferred embodiment. In the embodiment of FIG. 11d, the honeycomb 14 length may be approximately 50% of the distance between the baffle plate 8 and the dome plate 9 as measured along the centerline of the valve 2. The honeycomb 14 may be placed such that the axial lengths of the space between the baffle plate 8 and the entrance (e.g., upstream side) of the honeycomb 14 and the space between the exit (e.g., downstream side) of the honeycomb 14 and the dome plate 9 are approximately equal. The axial lengths are measured along the centerline of the valve 2. In the embodiments of FIGS. 11a-11f, the overall length of the muffler section 4 may be adjusted to provide sufficient space for the honeycomb 14 and, where applicable, the spaces between the baffle plate 8 and the honeycomb 14 and between the honeycomb 14 and the dome plate 9. These adjustments are subject to constraints arising from the integration of the valve 2 with the engine components.

The benefit of the honeycomb 14 may increase with decreasing cell size and with lower practical limit dictated by structural considerations and the concern for blockage from impurities in the bleed air. While in the preferred embodiment, the honeycomb 14 cell size may range from approximately $1/16$-inch to approximately $1/8$-inch, larger cell sizes, such as $1/4$-in or $1/2$-in, may also be deemed satisfactory. In another embodiment, the honeycomb may have non-uniform cell size in a manner that may promote flow uniformity and suppression of acoustic fluctuations.

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 12A:
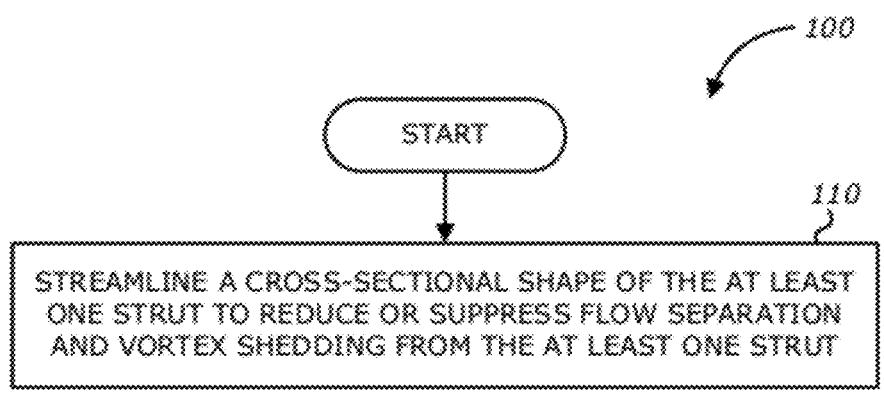
FIG. 12A-12B each illustrates a flow diagram of an example method of manufacturing a quiet bleed valve that expels a gas according to one embodiment of the invention.
Figure 12B:
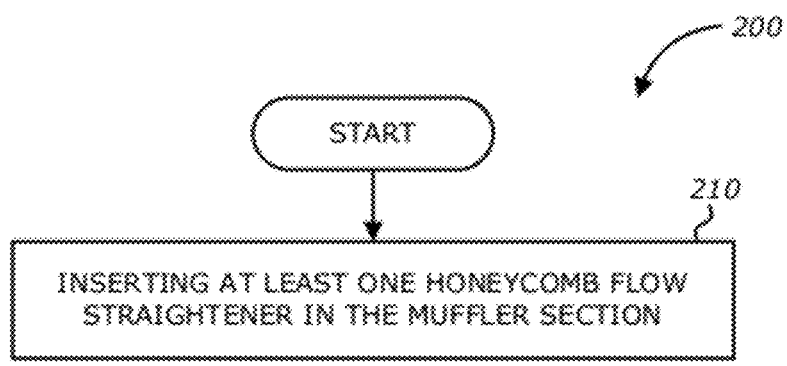

FIG. 12A-12B each illustrate a flow diagram of an example method of manufacturing a quiet bleed valve that expels a gas by modifying the design of the baseline bleed valve according to embodiments of the invention. As discussed above, the baseline bleed valve includes a valve section formed between a centerbody and a housing. The baseline bleed valve expels gas from a compressed region and this expelled gas flows between the centerbody and the housing. The centerbody is attached to the housing by at least one strut that is disposed substantially radially. The baseline bleed valve also includes a muffler section that is attached to the valve section and is located downstream from the valve section. The muffler section includes a baffle plate and a dome plate. The baffle plate is placed upstream of the dome plate.

In FIG. 12A, the method 100 illustrates one embodiment of a method of manufacturing a quiet bleed valve that produces a reduced amount of noise in comparison to this baseline bleed valve. Using the baseline bleed valve, the method 100 comprises streamlining a cross-sectional shape of the at least one strut to reduce or suppress flow separation and vortex shedding from the at least one strut (Block 110). The streamlining may be performed by a machine during manufacture of the quiet bleed valve.

In FIG. 12B, the method 200 illustrates one embodiment of a method of manufacturing a quiet bleed valve that produces a reduced amount of noise in comparison to this baseline bleed valve. Using the baseline bleed valve, the method 200 comprises inserting at least one honeycomb flow straightener in the muffler section (Block 210). The inserting of the at least one honeycomb may be performed by a machine during manufacture of the quiet bleed valve.

It is contemplated that the methods illustrated in FIGS. 12A and 12B may be used in combination in order to further reduce the noise of the baseline bleed valve.

In other embodiments, the bleed valve that includes the honeycomb in the muffler section may also comprise struts that have a cross-section that is streamlined to prevent substantial flow separation and suppress vortex shedding, as illustrated in FIGS. 4, 5 and 6C.

Part III: Alternative Enhancements

Figure 13:
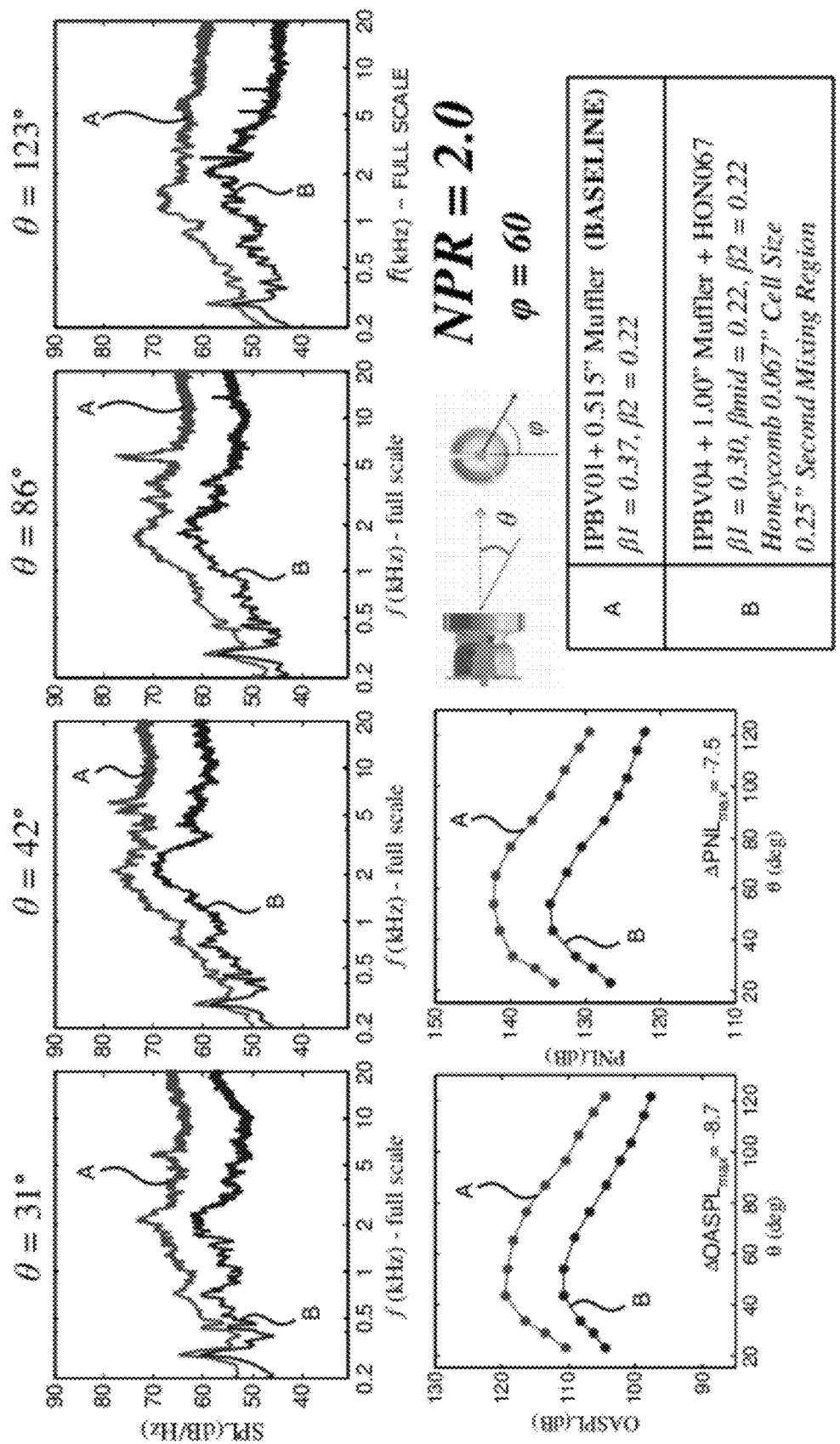
FIG. 13 illustrates the noise reductions measured by employing struts with elliptical cross section and honeycomb in the muffler according to one embodiment of the invention.

The approaches described in Part I (struts with a streamlined cross-section) and Part II (a muffler section including a honeycomb) work satisfactorily in isolation. However, the best acoustic results may be obtained by combining the two approaches. Example of the acoustic benefit of combining these two approaches is depicted in the acoustic results of FIG. 13. In FIG. 13, the curves labeled A correspond to the baseline valve and the curves labeled B correspond to the modified valve using struts with elliptical cross-section from FIG. 6a and the honeycomb in the muffler from FIG. 11d. It is noted that the sound pressure levels (SPL), overall sound pressure level (OASPL), and perceived noise level (PNL) are substantially lower for the modified valve.

Figure 14:
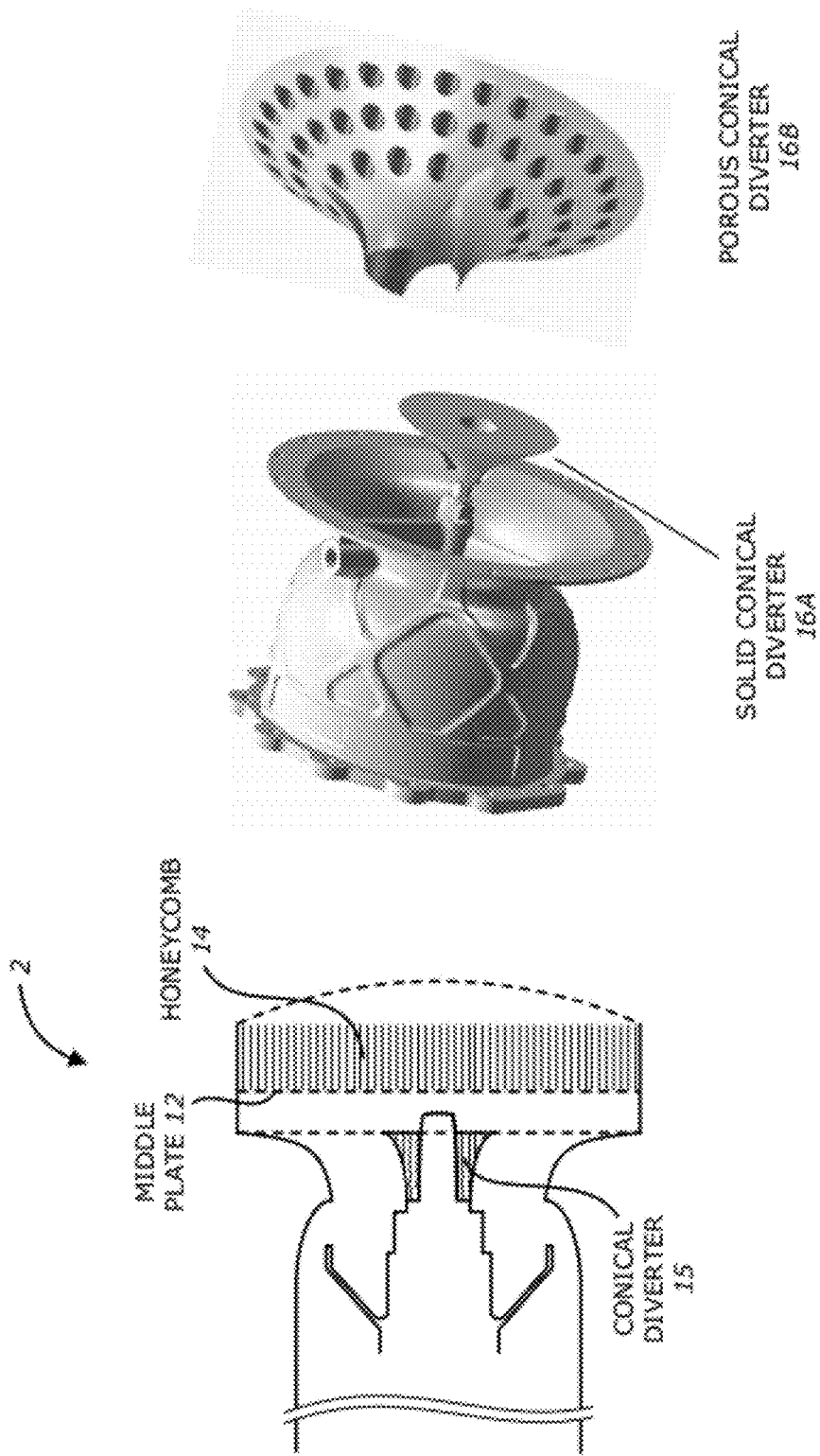
FIG. 14 illustrates a diverter that may be included in the bleed valve according to one embodiment of the invention.

Other alternative enhancements may further be included in the bleed valve that employs either of the approaches in Parts I and II or in the bleed valve that employs the combination of the approaches in Parts I and II. For instance, FIG. 14 illustrates a conical diverter that may be included in the bleed valve according to one embodiment of the invention. The conical diverter 16 as shown in FIG. 14 (left) may be included in as an optional element to the embodiment of the bleed valve 2 shown in FIG. 11*d*. However, the conical diverter 16 may be an additional optional element to any of the embodiments of the bleed valve 2 illustrated in FIGS. 11*a*-11*f*. As shown in FIG. 14, the conical diverter 16 may be placed immediately upstream of the baffle plate 8. Using the diverter 16, more flow from the valve may be forced towards the perimeter of the muffler section thereby improving the uniformity of the muffler flow field. The conical diverter 16 may be solid 16*a* or porous 16*b*. However, using the porous conical diverter 16*b*, a portion of the flow may be sent near the centerline of the bleed valve 2 which avoids creating a dead flow region that may cause a non-uniform exit flow.

Figure 15:
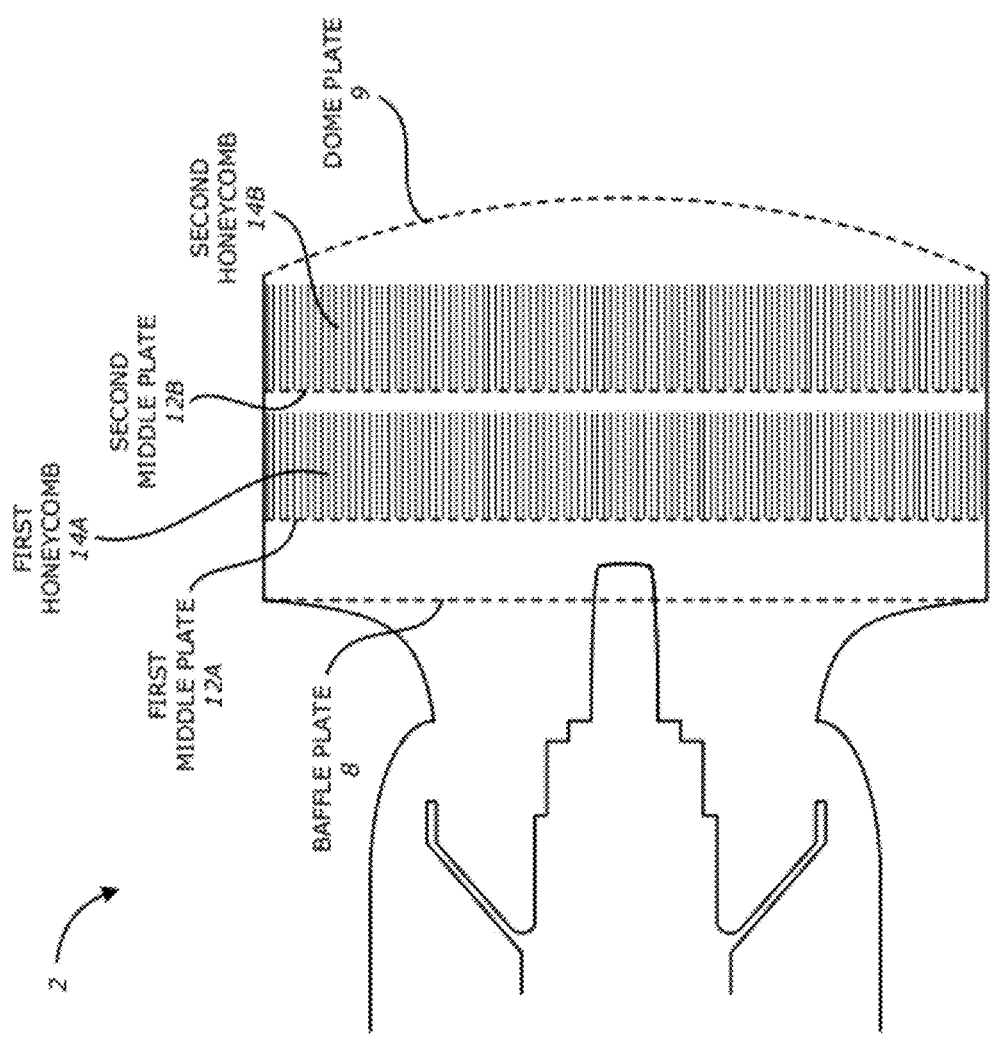
FIG. 15 illustrates an alternative muffler installation with a plurality of perforated plates and a plurality of honeycomb sections according to one embodiment of the invention.

FIG. 15 illustrates an alternative muffler installation with a plurality of perforated plates and a plurality of honeycomb sections according to one embodiment of the invention. As shown in FIG. 15, the muffler section includes a series of honeycomb sections 14*a*, 14*b* placed in sequence and surrounded by perforated plates. For instance, the first and second honeycombs 14*a*, 14*b* are provided between the baffle plate 8 and dome plate 9 in the muffler cavity. In this embodiment, a space is provided between the baffle plate 8 and the first honeycomb 14*a* and another space is provided between the second honeycomb 14*b* and the dome plate 9. This embodiment further includes the addition of the first middle plate 12*a* that is placed on the upstream face of the first honeycomb 14*a* and the addition of the second middle plate 12*b* on the upstream face of the second honeycomb 14*b*. The honeycomb sections may have the same or different cell sizes and cell patterns. In some embodiments, a space may be provided between the first honeycomb's 14*a* downstream face and the second middle plate 12*b*. In other embodiments, no space is provided between the first honeycomb's 14*a* downstream face and the second middle plate 12*b*.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A method of reducing noise from a bleed valve that expels a gas from a compressed region, the bleed valve including a valve section includes a centerbody and a housing, the gas flowing between the centerbody and the housing, the centerbody being coupled to the housing by at least one strut disposed substantially radially, and a muffler section coupled to the valve section and downstream of the valve section, the muffler section including a baffle plate and a dome plate, the baffle plate being placed upstream of the dome plate, the method comprising:
    inserting at least one honeycomb flow straightener in the muffler section, wherein inserting the at least one honeycomb flow straightener includes placing the at least one honeycomb section between the baffle plate and the dome plate.

2. The method of claim 1, wherein the dome plate is flat or curved.

3. The method of claim 1, wherein inserting the at least one honeycomb flow straightener in the muffler section includes filling the entire space between the baffle plate and the dome plate with the honeycomb section.

4. The method of claim 1 wherein inserting the at least one honeycomb flow straightener in the muffler section includes providing a space between the honeycomb section and the baffle plate.

5. The method of claim 1 wherein inserting the at least one honeycomb flow straightener in the muffler section includes providing a space between the honeycomb section and the dome plate.

6. The method of claim 1 wherein inserting the at least one honeycomb flow straightener in the muffler section includes providing a space between the honeycomb section and the baffle plate and providing a space between the honeycomb section and the dome plate.

7. The method of claim 4 further comprising inserting, in the muffler section, a middle perforated plate that is coupled on an upstream face of the honeycomb section.

8. The method of claim 6 further comprising inserting, in the muffler section, a middle perforated plate that is coupled to an upstream face of the honeycomb section.

9. The method of claim 2 wherein the at least one honeycomb flow straightener has flat faces.

10. The method of claim 2 wherein a downstream face of the honeycomb section conforms to the curvature of the dome plate.

11. The method of claim 1, further comprising a conical diverter placed immediately upstream of the baffle plate, the conical diverter being porous or solid.

12. The method of claim 1, wherein said at least one perforated plate comprises a plurality of perforated plates and the at least one honeycomb flow straightener comprises at least one honeycomb section inserted between adjacent perforated plates.

13. The method of claim 1, further comprising streamlining a cross-sectional shape of the at least one strut to reduce or suppress flow separation and vortex shedding from the at least one strut.

14. The method of claim 13 wherein the cross-section of the at least one strut is one or more of the following: an ellipse, an asymmetric ellipse, a rounded triangle; and an airfoil.

15. The method of claim 14, wherein the ellipse and the asymmetric ellipse having an aspect ratio equal to or greater than 2, and the rounded triangle and the airfoil having a chord-to-thickness ratio being equal to or greater than 2.

16. A method of reducing noise from a bleed valve that expels a gas from a compressed region, the bleed valve including a valve section includes a centerbody and a housing, the gas flowing between the centerbody and the housing, the centerbody being coupled to the housing by at least one strut disposed substantially radially, and a muffler section coupled to the valve section and downstream of the valve section, the muffler section including a baffle plate and a dome plate, the baffle plate being placed upstream of the dome plate, the method comprising:
    inserting at least one honeycomb flow straightener in the muffler section, wherein inserting the at least one honeycomb flow straightener includes placing the at least one honeycomb section between the baffle plate and the dome plate; and
    streamlining a cross-sectional shape of the at least one strut to reduce or suppress flow separation and vortex shedding from the at least one strut.

17. A bleed valve for expelling a gas from a compressed region, the bleed valve comprising:
- a valve section including a centerbody and a housing, the gas flowing between the centerbody and the housing, the centerbody being coupled to the housing by at least one strut disposed substantially radially; and
- a muffler section coupled to the valve section and being downstream of the valve section, the muffler section comprising at least two perforated plates and at least one honeycomb, wherein the gas flows through the at least one perforated plate and the at least one honeycomb, wherein the at least two perforated plates include a baffle plate and a dome plate, the baffle plate being placed upstream of the dome plate, and the at least one honeycomb is a honeycomb section located between the baffle plate and the dome plate.

18. The bleed valve of claim 17 wherein the dome plate is flat or curved.

19. The bleed valve of claim 17 wherein the honeycomb section fills the entire space between the baffle plate and the dome plate.

20. The bleed valve of claim 17 wherein a space is provided between the honeycomb section and the baffle plate.

21. The bleed valve of claim 17 wherein a space is provided between the honeycomb section and the dome plate.

22. The bleed valve of claim 17 wherein a space is provided between the honeycomb section and the baffle plate and a space is provided between the honeycomb section and the dome plate.

23. The bleed valve of claim 20 further comprising a middle perforated plate coupled to an upstream face of the honeycomb section.

24. The bleed valve of claim 22 further comprising a middle perforated plate coupled to an upstream face of the honeycomb section.

25. The bleed valve of claim 18 wherein the honeycomb faces are flat.

26. The bleed valve of claim 18 wherein a downstream face of the honeycomb section conforms to the curvature of the dome plate.

27. The bleed valve of claim 17, further comprising a conical diverter placed immediately upstream of the baffle plate, the conical diverter being porous or solid.

28. The bleed valve of claim 17, wherein the at least one perforated plate comprises a plurality of perforated plates and the at least one honeycomb comprises at least one honeycomb section inserted between adjacent perforated plates.

29. The bleed valve of claim 17, wherein the centerbody supports a plunger that controls the opening and closing of the bleed valve.

30. The bleed valve of claim 17, wherein the at least one strut has a cross-section that reduces or suppresses flow separation and vortex shedding from the at least one strut.

31. The bleed valve of claim 30 wherein the cross-section of the at least one strut is one or more of the following: an ellipse, an asymmetric ellipse, a rounded triangle, and an airfoil.

32. The bleed valve of claim 31, wherein the ellipse and the asymmetric ellipse have an aspect ratio equal to or greater than 2, and the rounded triangle and the airfoil have a chord-to-thickness ratio being equal to or greater than 2.

33. A bleed valve for expelling a gas from a compressed region, the bleed valve comprising:
- a valve section including a centerbody and a housing, the gas flowing between the centerbody and the housing, the centerbody being coupled to the housing by at least one strut disposed substantially radially, the at least one strut having a cross-section that reduces or suppresses flow separation and vortex shedding from the at least one strut; and
- a muffler section coupled to the valve section and being downstream of the valve section, the muffler section comprising at least two perforated plates and at least one honeycomb, wherein the gas flows through the at least two perforated plates and the at least one honeycomb, wherein the at least two perforated plates include a baffle plate and a dome plate, the baffle plate being placed upstream of the dome plate, and the at least one honeycomb is a honeycomb section located between the baffle plate and the dome plate.

* * * * *